(12) United States Patent
Bergmann et al.

(10) Patent No.: US 11,513,050 B2
(45) Date of Patent: Nov. 29, 2022

(54) PARTICULATE MATTER SENSOR

(71) Applicant: ams AG, Premstaetten (AT)

(72) Inventors: Alexander Bergmann, Eindhoven (NL); Martin Kraft, Eindhoven (NL)

(73) Assignee: ams AG, Premstaetten (AT)

( * ) Notice: Subject to any disclaimer, the term of this patent is extended or adjusted under 35 U.S.C. 154(b) by 0 days.

(21) Appl. No.: 16/771,969

(22) PCT Filed: Dec. 13, 2018

(86) PCT No.: PCT/EP2018/084766
§ 371 (c)(1),
(2) Date: Jun. 11, 2020

(87) PCT Pub. No.: WO2019/115694
PCT Pub. Date: Jun. 20, 2019

(65) Prior Publication Data
US 2021/0199555 A1 Jul. 1, 2021

Related U.S. Application Data

(60) Provisional application No. 62/599,129, filed on Dec. 15, 2017, provisional application No. 62/599,110, filed on Dec. 15, 2017.

(51) Int. Cl.
*G01N 15/06* (2006.01)
*G01N 1/22* (2006.01)

(52) U.S. Cl.
CPC ....... *G01N 15/0625* (2013.01); *G01N 1/2273* (2013.01); *G01N 2015/0693* (2013.01)

(58) Field of Classification Search
CPC .... G01N 21/3504; G01N 21/59; G01N 21/47; G01N 21/532; G01N 21/534; G01N 15/0618; G01N 15/1012; G01N 15/0625; G01N 2015/0046; G01N 2015/0693; G01N 2021/8585; G01N 2201/0636
USPC ............... 356/38, 432–440, 335–343, 246
See application file for complete search history.

(56) References Cited

U.S. PATENT DOCUMENTS

| | | | |
|---|---|---|---|
| 5,141,309 A * | 8/1992 | Worwag ............... A47L 9/2894 356/72 |
| 6,196,704 B1 * | 3/2001 | Gauch ................. B60Q 1/0023 362/276 |
| 7,038,765 B2 | 5/2006 | Petzold et al. |
| 9,671,324 B2 * | 6/2017 | Drinovec .............. G01N 21/31 |
| 10,495,573 B1 * | 12/2019 | Caubel ................. G01N 21/61 |
| 2005/0041774 A1 * | 2/2005 | Saitoh ............... G01N 15/0625 378/53 |
| 2008/0100826 A1 | 5/2008 | Sharpe |

(Continued)

OTHER PUBLICATIONS

International Preliminary Report on Patentability for Application No. PCT/EP2018/084766 dated Jun. 16, 2020 (7 pages).

(Continued)

*Primary Examiner* — Hoa Q Pham
(74) *Attorney, Agent, or Firm* — Michael Best & Friedrich LLP

(57) ABSTRACT

A particulate matter sensor including a light source, a photodetector, and a particle filter. The light source and the photodetector are arranged in the same plane as the particle filter. Integrated particulate matter sensors are operable to detect particulate matter by measuring an optical characteristic of a filter.

19 Claims, 3 Drawing Sheets

(56) References Cited

U.S. PATENT DOCUMENTS

| | | | |
|---|---|---|---|
| 2010/0027013 A1* | 2/2010 | Hansen | G01N 15/0625 |
| | | | 356/432 |
| 2010/0108890 A1* | 5/2010 | Gunasekaran | G01N 21/94 |
| | | | 250/341.5 |
| 2012/0105848 A1* | 5/2012 | Fukui | G01N 15/0205 |
| | | | 356/336 |
| 2016/0025628 A1 | 1/2016 | Kim et al. | |
| 2016/0216200 A1 | 7/2016 | Mocnik et al. | |
| 2017/0268980 A1* | 9/2017 | Clayton | G01N 15/0625 |

OTHER PUBLICATIONS

International Search Report and Written Opinion for Application No. PCT/EP2018/084766 dated Apr. 4, 2019 (9 pages).

* cited by examiner

PARTICULATE MATTER SENSOR

CROSS-REFERENCE TO RELATED APPLICATION(S)

This application is the U.S. national stage entry, under 35 U.S.C. § 371, of International Application No. PCT/EP2018/084766, filed Dec. 13, 2018, which claims the benefit of priority of U.S. Provisional Patent Application Nos. 62/599,129 and 62/599,110, both filed on Dec. 15, 2017. The entire contents of the foregoing applications are incorporated herein by reference.

FIELD OF THE DISCLOSURE

The present disclosure relates to particulate matter sensors.

BACKGROUND

Airborne particulate matter can be generated, for example, by different forms of combustion, chemical processes, or mechanical wear. The size of the particles varies over a wide range, with some particles settling quickly in still air, whereas smaller particles may remain suspended for longer periods of time. Air containing such particulate matter (e.g., under polluted conditions) may be perceived as smoke or haze. Exposure to particulate matter can be harmful to human health. Further, some particulates act as abrasives or contaminates, and can interfere with the performance of equipment.

As small, mobile computing devices such as smartphones have proliferated, there has been an increasing interest in using such devices to sense air quality based on the presence and amount of particular matter in the air. However, to integrate particulate matter sensing into a mobile device, the particular matter sensor needs to be compact. Given the nature of smartphone use, it also would be beneficial to avoid the need to replace components of the particular matter sensor periodically in order to obtain an accurate sensed value.

SUMMARY

The present disclosure describes integrated particulate matter sensors that detect particulate matter present in a fluid (e.g., ambient air) by measuring an optical characteristic of a filter.

For example, in one aspect, the present disclosure describes a particulate matter sensor including a housing, a photodetector in the housing, a particle filter held in the housing in a fixed position with reference to the photodetector, and a light source in the housing. The particle filter is arranged for a particle-containing fluid to pass through the particle filter. The light source is operable to produce light at least some of which is incident on the particle filter. The photodetector is operable to measure an optical characteristic of the particle filter based on light interacting with the particle filter.

Some implementations include one or more of the following features. For example, in some implementations, the particle filter is fixed in place such that it cannot be advanced. The particle filter can be composed, for example, of a material that is CMOS-compatible material. In some instances, the particle filter is composed of micro-porous silicon dioxide or micro-porous silicon nitride. The particulate matter sensor can include a filter assembly having a filter housing that holds the particle filter in place over the photodetector. In some cases, the particle filter is a hydrophobic fiber filter or a membrane filter.

The particulate matter sensor may include a reflective surface in the housing, wherein the reflective surface is disposed so as to reflect light emitted by the light source toward the particle filter. In some implementations, a second photodetector is provided on a wall of the housing and is disposed to detect light scattered by particles in or on the particle filter. In some cases, multiple photodetectors are positioned, respectively, at different angles with respect to light incident on and/or scattered by the particle filter.

In some instances, the optical characteristic is optical transmission, optical absorption or optical scattering, or a rate of change of optical transmission, optical absorption or optical scattering.

In another aspect, the present disclosure describes a particulate matter sensor that includes a particle filter arranged for a particle-containing fluid to pass through the particle filter in a first direction, the particle filter being disposed in a plane transverse to the first direction. The sensor further includes light source arranged in the same plane as the particle filter and operable to produce light that is coupled into a side edge of the particle filter. A photodetector is arranged in the same plane as the particle filter and is operable to sense light produced by the light source after the light passes through the particle filter and emerges from the side edge of the particle filter.

Some implementations include one or more of the following features. For example, the particulate matter sensor can include multiple light sources, each of which is arranged in the same plane as the particle filter and is operable to produce light of a different respective wavelength, wherein the light is coupled into the side edge of the particle filter, the photodetector being operable to sense light produced by each of the light sources. In some instances, the light sources are operable independently of one another. Further, in some cases, the light source(s) can be located in contact with the side edge of the filter such that light produced by the light source(s) is emitted directly into the filter without traveling through free space.

In some implementations, the particulate matter sensor includes multiple photodetectors, each of which is arranged in the same plane as the particle filter and is operable to sense light of a different respective wavelength produced by the light source after the light passes through the particle filter. The light source can be, for example, a broad band light source. In some cases, there are multiple light source—photodetector combinations, wherein a distance between a particular one of the light sources and a corresponding one of the photodetectors differs for different ones of the light source—photodetector combinations.

In some instances, the particulate matter sensor included a first silicon substrate having a through-hole in which the particle filter is disposed, the first silicon substrate containing the light source and the photodetector. The particulate matter sensor also may include a second silicon substrate having a through-hole for the particle-containing fluid to pass in the first direction through the particle filter, the second silicon substrate containing electronics operable to control the light source and/or to acquire and process output signals from the photodetector.

In a further aspect, the present disclosure describes a host device that includes a particulate matter sensor, an application executable on the host device and operable to conduct air quality testing based on signals from the particulate matter sensor, and a display screen operable to display a test result of the application.

Various advantages may be provided by some implementations. For example, the particulate matter sensors described here can, in some cases, detect particulate matter (e.g., fine dust) having a diameter as small as 10 μm or even less. The sensor can be made highly compact. In some cases, they can have a sufficiently small thickness (i.e., z-height) to allow them to be integrated into a handheld or mobile host computing device such as a smartphone, laptop computer or tablet computer.

Other aspects, features and advantages will be readily apparent from the following detailed description, the accompanying drawings and the claims.

DETAILED DESCRIPTION

The present disclosure describes integrated particulate matter sensors that detect particulate matter present in a fluid (e.g., ambient air) by measuring an optical characteristic of a filter. Fluid flowing through the filter causes accumulation of particulate matter from the fluid onto the filter, changing an optical characteristic such as an absorption of light by the filter. The filter is illuminated by a light source, such as a light emitting diode, and light transmitted through the filter is measured by an integrated circuit photodiode. The particulate matter sensors described here can be integrated into compact particulate matter sensing systems that can be used, e.g., to carry out mobile device based air quality sensing.

Figure 1:
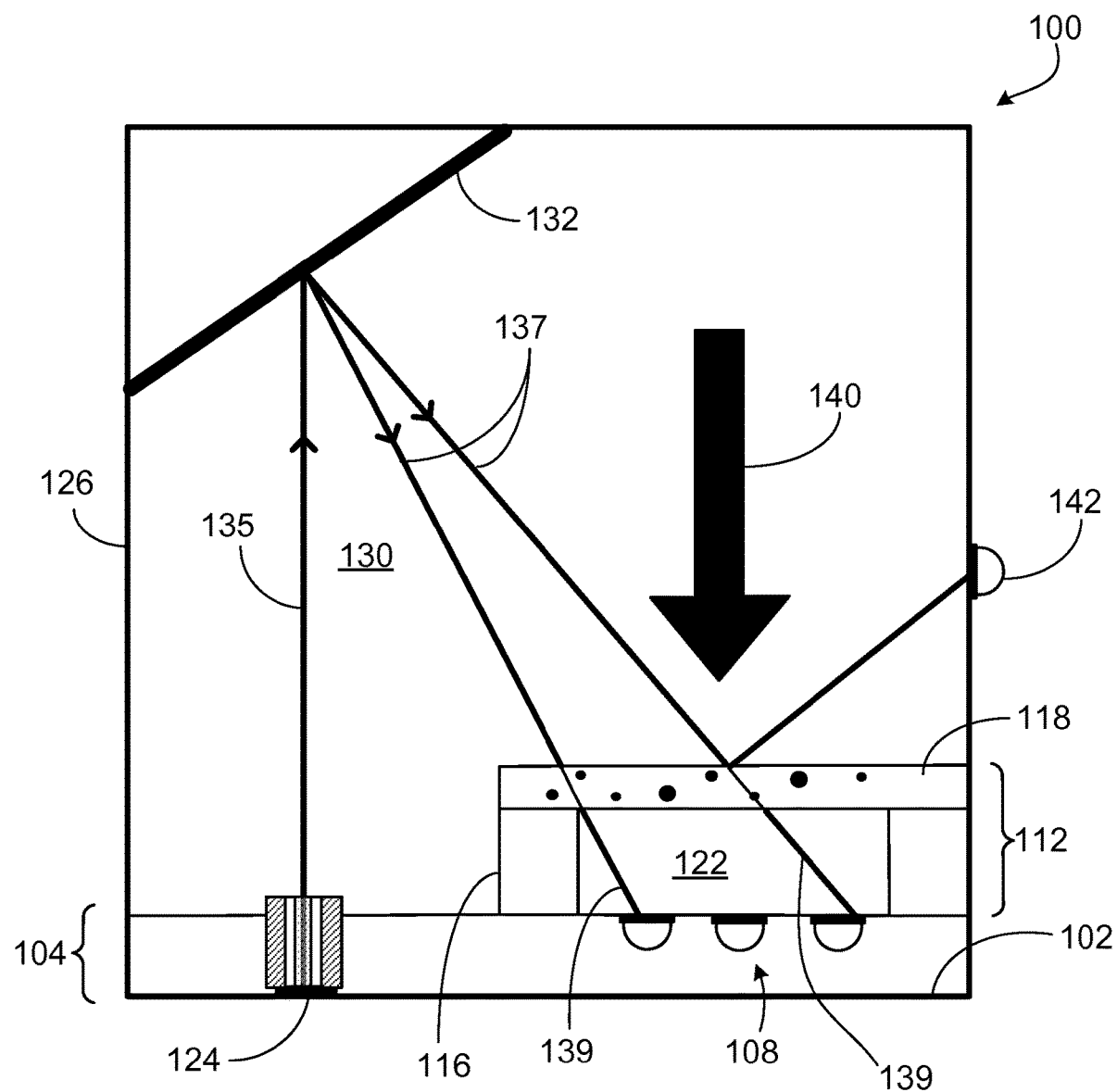
FIG. 1 is a diagram of a first particulate matter sensor.

As shown in FIG. 1, an example particulate matter sensor 100 includes a substrate 102, such as a printed circuit board. An integrated circuit 104, such as a silicon-based integrated circuit (e.g., a complementary metal-oxide-semiconductor (CMOS) integrated circuit), is electrically connected to the substrate 102. In some examples, the integrated circuit is connected to the substrate 102 by through silicon vias (TSVs), a backside redistribution layer, and solder balls. In some examples, the integrated circuit can be connected to the substrate by wire bonding. Other types of connections also can be used. The integrated circuit includes a photodetector 108, such as a photodiode, a pinned photo diode, a pin photodiode, an avalanche photo diode, a single photon avalanche photo diode, or another type of photo diode. In some examples, e.g., to reduce cross talk, the photodetector 108 can be implemented as a photodetector that has a low sensitivity to carriers generated within the semiconductor body of the integrated circuit, such as a substrate isolated photo diode (e.g., p+ in an n-well for a p-type integrated circuit body). In some instances, multiple photodetectors 108 are provided, each of which of can be sensitive to a different respective wavelength or range of wavelengths.

A filter assembly 112 is affixed to the integrated circuit 104 by a connection layer such as an adhesive or a weld. The filter assembly 112 includes a filter housing 116 that holds a particle filter 118, such as a hydrophobic fiber filter, a membrane filter, or another type of filter. Preferably, the filter 118 is composed of a material that is compatible with complementary metal-oxide-semiconductor (CMOS) manufacturing processes. Examples include micro-porous silicon dioxide (Sift) or silicon nitride ($Si_3N_4$). In some implementations, the filter 118 is a quartz fiber filter or a filter coated with a synthetic fluoropolymer of tetrafluoroethylene (e.g., a Teflon™-coated filter).

The particle filter 118 can be affixed to the filter housing 116, for example, by a layer of adhesive. The filter 118 is fixed in place and is stationary; thus, preferably the filter 118 cannot be rolled, rotated or otherwise advanced when fixed in place and held by the housing 116. In some applications (e.g., mobile phone applications), the components of the particulate matter sensor 100—including the filter 118—have an expected shelf-life at least as long as the expected shelf-life of the host device itself (e.g., the smartphone). Thus, there is no need to be able to advance the position of the filter after each measurement or after a series of measurements.

The particle filter 118 can have openings sized such that particulate matter of a target size cannot pass through the particle filter 118. For instance, the particle filter can have openings with a diameter of less than about 100 nm. The filter housing 116, which can be formed of a molded material such as a molded plastic, holds the particle filter 118 in alignment with the photodetector 108 such that a cavity 122 is defined between the particle filter 118 and the integrated circuit on the substrate. The cavity 122 is fluidically connected to a flow channel through the filter housing 116 such that the cavity 122 and the flow channel together form a flow path for fluid to flow through the particle filter 118.

A light source 124, such as a light-emitting diode (LED), a vertical cavity surface emitting laser (VCSEL), a laser diode, or another type of light source, is electrically connected to the substrate 102, e.g., by solder balls, wire bonding, or another type of connection. The light source 124 is disposed such that light emitted from the light source 124 illuminates the particle filter 118, which is transparent or translucent for the particular part of the electromagnetic spectrum emitted by the light source (e.g., infrared or visible).

A sensor housing 126 is affixed to the substrate 102, e.g., by an adhesive. The sensor housing 126 can be composed, for example, of a molded material such as a molded plastic. The sensor housing 126 and the substrate 102 define an interior space 130 within which the integrated circuit 104, the filter assembly 112, and the light source 124 are disposed.

The material or color, or both, of the sensor housing 126 can be selected such that light 135 emitted from the light source 124 and incident on an interior surface 132 within the sensor housing 126 is reflected by the interior surface 132 onto the particle filter 118 (shown as arrows 137). For instance, the interior surface 132 of the sensor housing 126 can be reflective to light emitted by the light source 124 (e.g., having at least 30% reflectivity to the wavelength(s) of light emitted by the light source 124). In some examples, the interior surface 132 of the sensor housing 126 is coated with a reflective material, such as an aluminum film. In some examples, the sensor housing 126 is shaped such that a large amount of light incident from the light source 124 is reflected onto the particle filter 118. For instance, a wall 133 of the sensor housing 126 can be angled relative to the substrate 102 to cause light reflection onto the particle filter 118.

In operation, light emitted from the light source 124 is incident on the particle filter 118 (e.g., via reflection from the interior surface 132 of the sensor housing 126). The photodetector(s) 108 measures an amount of light 139 transmitted through the particle filter 118. As a particle-containing fluid 140 flows through the particle filter 118, particulate matter accumulates on or in the filter 118. The particulate matter on or within the filter 118 causes absorption, scattering, or both, of the light 137 incident on the filter 118, thereby reducing the amount of light transmitted through the filter 118. In particular, the fluid stream 140 is passed through the filter 118, which traps the suspended particulates, creating a deposit of increasing density. A light beam projected through the deposit is attenuated by those particles which are absorbing (black') rather than scattering ('white').

An optical characteristic of the particle filter 118 is detected by the photodetector 108 formed in the integrated circuit 104. The optical characteristic can be, for example, optical transmission, optical absorption or optical scattering, or the rate of change of one of these properties. Thus, the optical characteristic can include, for example, an amount of light transmitted through the particle filter or an absorption of the particle filter. The optical characteristic can include a rate of change of an optical characteristic, such as a rate of change in the amount of light transmitted through the particle filter or a rate of change in the absorption of the particle filter. For example, measurements can be made by the photodetector 108 at successive regular time intervals. The increase in attenuation from one measurement to the next is proportional to the increase in the density of optically absorbing material in or on the filter 118, which, in turn, is proportional to the concentration of the material in the sampled air stream. The particle concentration at a given time can be derived from this integrated signal using an appropriate algorithm (e.g., first derivative of signal vs. time). Measurements of the sample fluid flow rate and knowledge of the instrument's optical and mechanical characteristics permit a calculation of the average concentration of absorbing particles in the fluid stream 140 during the sampling period. Thus, the detected optical characteristic can be used to characterize a quality of the fluid 140, such as an air quality (e.g., an amount of particulate matter in the fluid such as an amount of black carbon in the fluid). Control and processing electronics in the integrated circuit 104 can control operation of the light source 124 and can process signals from the photodetector 108.

In some instances, the filter 118 serves as an integrating element for the entire lifetime of the sensor 100, without the need to replace it after each measurement or after a series of measurements. For example, the sensor 100 can be integrated into a smartphone or other host device that in some cases has an expected lifetime less than the expected useful lifetime of the filter 118.

Some implementations include two or more photodetectors positioned at different angles with respect to incident and/or scattered light. For example, some implementation include an additional photodetector 142 (e.g., a photo diode, a pinned photo diode, a pin photodiode, an avalanche photo diode, a single photon avalanche photo diode, or another type of photo diode) disposed at a side of the housing 126. This additional photodetector 142 can be used to sense light scattered, for example, by particles in or on the filter 118 and may be used as an additional basis for measuring an optical characteristic of the filter 118. Measurements by the additional photodetector 142 can be used to supplement and/or confirm that information obtained from the photodetector(s) 108.

Figure 2:
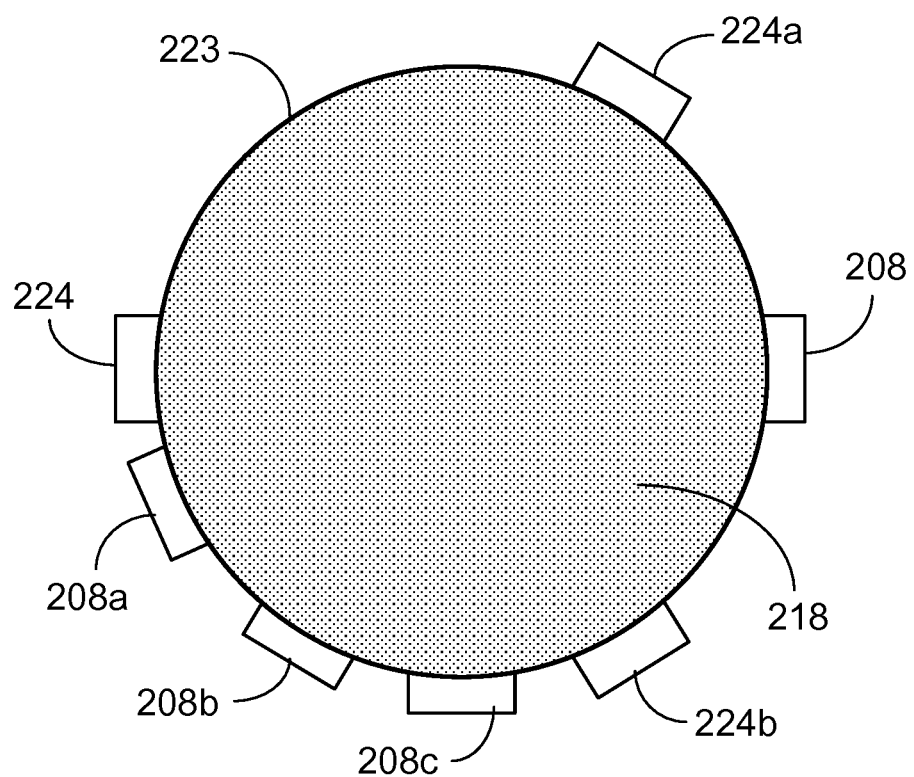
FIG. 2 illustrates a top perspective of a second particulate matter sensor.
Figure 3:
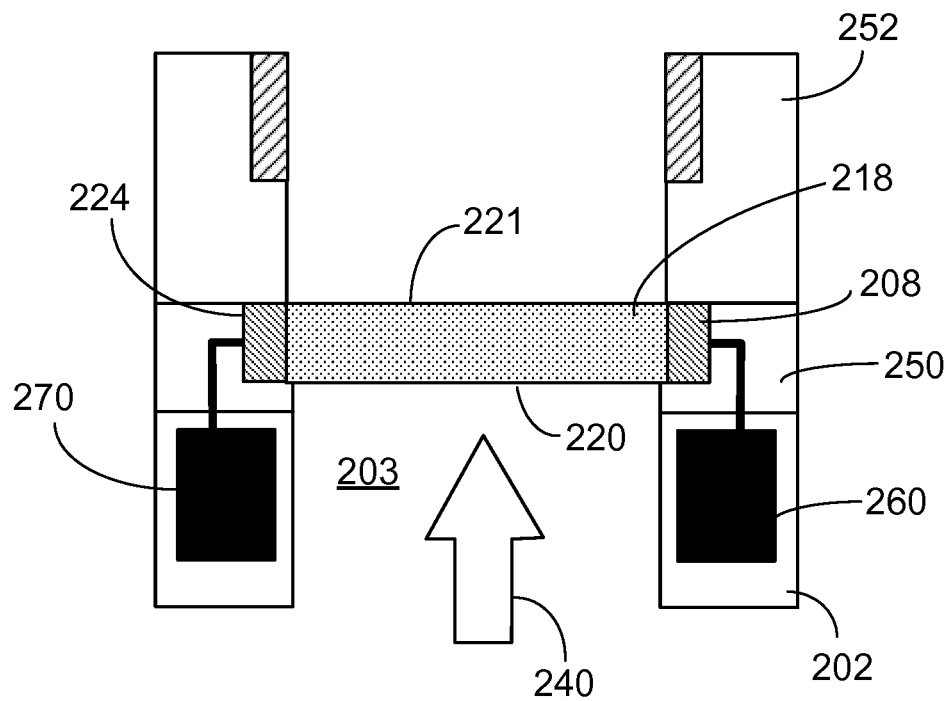
FIG. 3 is a cross-sectional side view of second particulate matter sensor.

FIGS. 2 and 3 illustrate another example of a particulate matter sensor 200 that includes a particle filter 218. The filter 218 serves as a filter for particles in a manner similar to that described above with respect to the filter 118 of FIG. 1. Thus, the filter 218 can be implemented using any of the materials described above with respect to the filter 118.

The filter 218 also can act a waveguide for one or more light sources 224, 224a, 224b that illuminate particles deposited within the filter 218 and that are arranged laterally in the same plane as the filter 218. For example, the filter 218 has a first surface 220, and a second surface 221 on the opposite side of the filter. The light source(s) 224, 224a, 224b can be arranged at different positions about the periphery (e.g., circumference) 223 of the filter 218. In some instances, each light source 224, 224a, 224b is located in close proximity to (e.g., in contact with) the side edge of the filter 218 such that light produced by the light source is emitted directly into the filter 218 without traveling through free space. In some cases, optical elements (e.g., optical fibers or lenses) may be provided to couple light from the light sources to the side edge of the filter 218. The light sources can be operable independently of one another such that they can be triggered to emit light at the same or at different times from one another.

Likewise, one or more photodetectors 208, 208a, 208b, 208c can be arranged laterally in the same plane as the filter 218. For example, the photodetectors 208, 208a, 208b, 208c can be arranged at different positions about the periphery (e.g., circumference) of the filter 218. In some instances, each photodetector 208, 208a, 208b, 208c is located in proximity to (e.g., in contact with) the side edge of the filter 218 such that light traveling through the filter (i.e., in a direction substantially parallel to the plane of the filter) and emerging from the side edge of the filter can be sensed by one of the photodetectors.

In some implementations, each of the light sources 224, 224a, 224b is implemented as a VCSEL operable to emit light of a wavelength different from at least some of the other light sources. Further, each of the photodetectors 208, 208a, 208b, 208c can be operable to detect a wavelength of light emitted by a respective one of the light sources. In some examples, multiple wavelengths can be used to enable the identification of different types of particulate matter (referred to as source apportionment). In some examples, each light source of multiple light sources is operable to emit light of a different wavelength. In some examples, one or more broad spectrum light sources, such as white LEDs, can be used to provided multiple wavelengths. For multiple wavelength sensing, the photodetectors 208, 208a, 208b, 208c can be divided into multiple regions, with each region covered with a wavelength filter to enable detection of specific wavelength(s). For instance, the photodetectors 208, 208a, 208b, 208c can be divided into a first region sensitive to infrared light (e.g., 880 nm wavelength light) and a second region sensitive to blue light (e.g., 470 nm light). In some instances, a single photodetector (e.g., 208) is sensitive to all the wavelengths of interest. Thus, a particular photodetector can be paired with one or more light sources; likewise, particular light source can be paired with one or more photodetectors. Further, the number of light sources and photodetectors may differ from one another.

The light sources 224, 224a, 224b may be mounted symmetrically or asymmetrically about the perimeter of the filter 218 with respect to the photodetectors 208, 208a, 208b, 208c. In some implementations, the distance between a particular light source and its corresponding photodetector can differ for various light source—photodetector combinations. Thus, different light source—photodetector combinations can correspond to a range of light-particle interaction paths having different respective lengths (i.e., some of the paths through the filter 218 are longer than others). The shorter light-particle interaction paths may be useful, for example, as more particles accumulate in the filter 218 over time. Although the sensitivity of the sensor over time may be reduced somewhat, its lifetime can be extended by the availability of the shorter paths because the shorter path increases the likelihood that at least some light will be detected even when a significant amount of particles accumulate in the filter.

As shown in FIG. 3, the filter 218 can be disposed within a through hole of a first CMOS-compatible substrate 250 such as a silicon die that laterally surrounds the filter. In some implementations, the photodetector(s) 208, 208*a*, 208*b*, 208*c* can be formed in the silicon material 250. The light source(s) 224, 224*a*, 224*b* can be attached at the periphery of the filter 218, for example, using an optical adhesive.

A second CMOS-compatible substrate 202 (e.g., a silicon die) is attached to the first substrate 250 and has an aperture 203 aligned with the filter 218. In operation, as a particle-containing fluid 240 flows through the aperture 203 and through the particle filter 218, particulate matter accumulates on or in the filter 218. The particulate matter within the filter 218 causes absorption, scattering, or both, of the light produced by the light source(s) 224, 224*a*, 224*b*, thereby reducing the amount of light transmitted laterally through the filter 218. In particular, the fluid stream 240 is passed through the filter 218, which traps the suspended particulates, creating a deposit of increasing density. A light beam projected laterally through the deposit is attenuated by those particles which are absorbing ('black') rather than scattering ('white').

The second substrate 202 can house control electronics 270 operable to control the turning on and off of the light sources 224, 224*a*, 224*b*. The second substrate 202 also can house processing electronics 260 operable to acquire and process output signals from the photodetectors 208, 208*a*, 208*b*, 208*c*. The control electronics 270 can be programmed, for example, to turn the light sources on and/or off at the same time, sequentially, or in some other predetermined manner.

An optical characteristic of the particle filter 218 is detected by the photodetector(s) 208, 208*a*, 208*b*, 208*c*. The optical characteristic can include, for example, an amount of light transmitted through the particle filter or an absorption of the particle filter. The optical characteristic can include a rate of change of an optical characteristic, such as a rate of change in the amount of light transmitted through the particle filter or a rate of change in the absorption of the particle filter. For example, measurements can be made by the photodetector(s) 208, 208*a*, 208*b*, 208*c* at successive regular time intervals. The increase in attenuation from one measurement to the next is proportional to the increase in the density of optically absorbing material in the filter 218, which, in turn, is proportional to the concentration of the material in the sampled air stream. The particle concentration at a given time can be derived from this integrated signal using an appropriate algorithm (e.g., first derivative of signal vs. time). Measurements of the sample fluid flow rate and knowledge of the instrument's optical and mechanical characteristics permit a calculation of the average concentration of absorbing particles in the fluid stream 240 during the sampling period. Thus, the detected optical characteristic can be used to characterize a quality of the fluid 240, such as an air quality (e.g., an amount of particulate matter in the fluid such as an amount of black carbon in the fluid).

An advantage of using CMOS-compatible substrates is that they can facilitate integration with the CMOS processes and also can be integrated into wafer-level manufacturing processes. Wafer-level processes allow multiple sensors to be fabricated at the same time. In the wafer-level process, after attaching the wafers that form the first and second substrates 250, 202 in a stack, the stack can be singulated (e.g., by dicing) into separate individual sensors such as those described above.

In some examples, a third CMOS-compatible substrate 252 (e.g., a portion of a silicon wafer) may be attached to the first substrate 250 as a stack in which the first substrate 250 is disposed between the second and third substrates 202, 252. The third substrate 252 can be used to house additional components (e.g., electronics) in some implementations. In some implementations, however, the third substrate 252 is omitted.

The particulate matter sensor 200 of FIGS. 2 and 3 can, in some cases, provide various benefits. For example, the particulate matter sensors described here can be made highly compact and, in some cases, can be made sufficiently compact to be integrated into a handheld or mobile host computing device such as a smartphone, laptop computer or tablet computer. Some host devices, however, have a very small z-height (i.e., thickness). In such instances, it can be desirable to provide a particularly small overall height for the sensor. The sensor 200 of FIGS. 2 and 3 can help achieve such features.

Further, using the particulate matter sensor 100 of FIG. 1, large particles sometimes may be deposited directly on the filter 118, but may not enter the filter. Such particles may disproportionately impact the optical signal detected by the photodetector 108. The implementation of FIGS. 2 and 3 can, in some instances, alleviate such situations because the light signal need not pass perpendicularly through the plane of the filter 218, but is coupled laterally into the side edge of the filter 218 and is detected as it exits the side edge of the filter.

Figure 4:
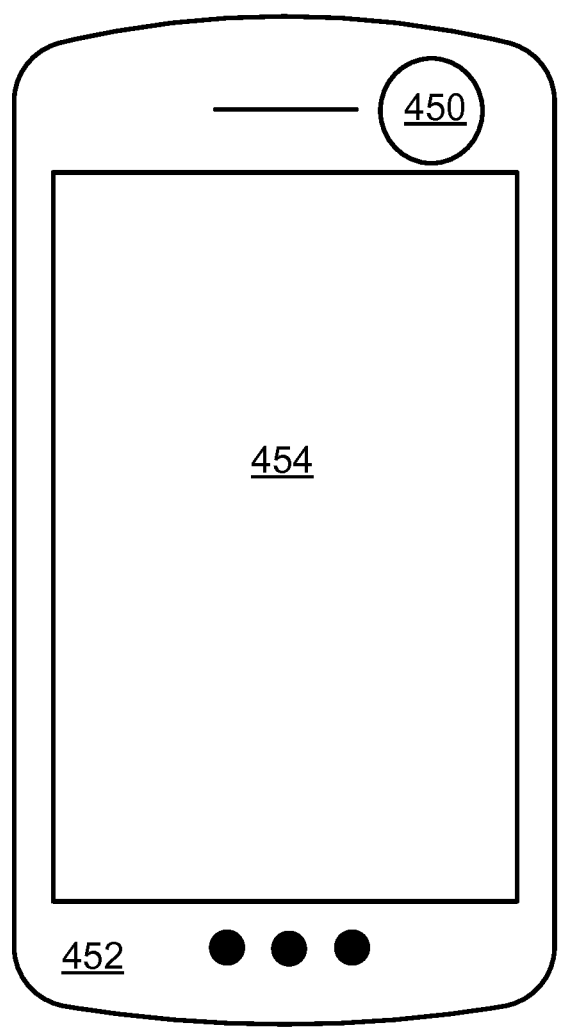
FIG. 4 illustrates an example of a host device including a particulate matter sensor.

As shown in FIG. 4, a particulate matter sensor system 450 including a particulate matter sensor (e.g., sensor 100 or 200) can be incorporated into a mobile or handheld computing device 452, such as a smartphone (as shown), a tablet, or a wearable computing device. The particulate matter sensor system 450 can be operable by a user, e.g., under control of an application executing on the mobile computing device 452, to conduct air quality testing based on signals from the particulate matter sensor. A test result can be displayed on a display screen 454 of the mobile computing device 452, e.g., to provide substantially immediate feedback to the user about the quality of the air in the user's environment.

The particulate matter sensors described here can also be incorporated into other devices, such as air purifiers or air conditioning units; or used for other applications such as automotive applications or industrial applications to obtain air quality measurements, with the data being used for studies of the impact of air pollution on public health, climate change, and/or visibility.

Various modifications will be readily apparent and can be made to the foregoing examples. Features described in connection with different embodiments may be incorporated into the same implementation in some cases, and various features described in connection with the foregoing examples may be omitted from some implementations. Thus, other implementations are within the scope of the claims.

What is claimed is:

1. A particulate matter sensor comprising:
a housing;
a photodetector in the housing;
a particle filter held in the housing in a fixed position with reference to the photodetector, the particle filter being arranged for a particle-containing fluid to pass through the particle filter in a first direction, wherein the particle filter is disposed in a plane transverse to the first direction; and
a light source in the housing, the light source operable to produce light in a direction transverse to the first direction, wherein at least some of the light is incident on the particle filter;
wherein the photodetector is operable to measure an optical characteristic of the particle filter based on light interacting with the particle filter;
wherein the light source and the photodetector are arranged laterally in the same plane as the particle filter; and
wherein the light source is located in contact with a side edge of the filter such that light produced by the light source is emitted directly into the filter without traveling through free space.

2. The particulate matter sensor of claim 1 wherein the particle filter cannot be advanced.

3. The particulate matter sensor of claim 1 wherein the particle filter is composed of a material that is CMOS-compatible material.

4. The particulate matter sensor of claim 1 wherein the particle filter is composed of micro-porous silicon dioxide or micro-porous silicon nitride, and/or wherein the particle filter is hydrophobic fiber filter or a membrane filter.

5. The particulate matter sensor of claim 1 including a filter assembly in the housing, the filter assembly including a filter housing that holds the particle filter in place relative to the photodetector.

6. The particulate matter sensor of claim 1 further including a reflective surface in the housing, wherein the reflective surface is disposed so as to reflect light emitted by the light source toward the particle filter.

7. The particulate matter sensor of claim 1 further including a second photodetector on a wall of the housing and disposed to detect light scattered by particles in or on the particle filter.

8. The particulate matter sensor of claim 1 including a plurality of photodetectors positioned, respectively, at different angles with respect to light incident on and/or scattered by the particle filter.

9. The particulate matter sensor of claim 1 wherein the optical characteristic is optical transmission, optical absorption or optical scattering, or a rate of change of optical transmission, optical absorption or optical scattering.

10. A host device comprising:
a particulate matter sensor according to claim 1;
an application executable on the host device and operable to conduct air quality testing based on signals from the particulate matter sensor; and
a display screen operable to display a test result of the application.

11. A particulate matter sensor comprising:
a particle filter arranged for a particle-containing fluid to pass through the particle filter in a first direction, the particle filter being disposed in a plane transverse to the first direction;
a light source arranged in the same plane as the particle filter and operable to produce light in a direction transverse to the first direction, wherein the light is coupled into a side edge of the particle filter;
a photodetector arranged in the same plane as the particle filter and operable to sense light produced by the light source after the light passes through the particle filter and emerges from the side edge of the particle filter; and
wherein the light source is located in contact with the side edge of the filter such that light produced by the light source is emitted directly into the filter without traveling through free space.

12. The particulate matter sensor of claim 11 including a plurality of light sources, each of which is arranged in the same plane as the particle filter and is operable to produce light of a different respective wavelength, wherein the light is coupled into the side edge of the particle filter, the photodetector being operable to sense light produced by each of the light sources.

13. The particulate matter sensor of claim 12 wherein the light sources are operable independently of one another.

14. The particulate matter sensor of claim 12 comprising a plurality of light source—photodetector combinations, wherein a distance between a particular one of the light sources and a corresponding one of the photodetectors differs for different ones of the light source—photodetector combinations.

15. The particulate matter sensor of claim 11 including a plurality of photodetectors, each of which is arranged in the same plane as the particle filter and is operable to sense light of a different respective wavelength produced by the light source after the light passes through the particle filter.

16. The particulate matter sensor of claim 15 wherein the light source is a broad band light source.

17. The particulate matter sensor of claim 11 including a first silicon substrate having a through-hole in which the particle filter is disposed, the first silicon substrate containing the light source and the photodetector.

18. The particulate matter sensor of claim 17 including a second silicon substrate having a through-hole for the particle-containing fluid to pass in the first direction through the particle filter, the second silicon substrate containing electronics operable to control the light source and/or to acquire and process output signals from the photodetector.

19. A host device comprising:
a particulate matter sensor according to claim 11;
an application executable on the host device and operable to conduct air quality testing based on signals from the particulate matter sensor; and
a display screen operable to display a test result of the application.

* * * * *